(12) United States Patent
Kim

(10) Patent No.: US 8,566,898 B2
(45) Date of Patent: Oct. 22, 2013

(54) METHOD AND APPARATUS FOR SECURING INFORMATION IN A WIRELESS NETWORK PRINTING SYSTEM

(75) Inventor: Byoung-yue Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1384 days.

(21) Appl. No.: 11/416,098

(22) Filed: May 3, 2006

(65) Prior Publication Data

US 2006/0272010 A1 Nov. 30, 2006

(30) Foreign Application Priority Data

May 3, 2005 (KR) .................. 10-2005-0037033

(51) Int. Cl.
*H04L 29/06* (2006.01)

(52) U.S. Cl.
USPC ....... 726/1; 726/3; 726/7; 380/270; 358/1.14; 358/1.15; 358/401; 358/402

(58) Field of Classification Search
USPC ................... 380/270; 726/3; 358/500
See application file for complete search history.

(56) References Cited

U.S. PATENT DOCUMENTS

| 7,237,267 B2* | 6/2007 | Rayes et al. ................. 726/25 |
| 2004/0228490 A1* | 11/2004 | Klemba et al. .............. 380/270 |
| 2005/0154874 A1* | 7/2005 | Koga ........................... 713/150 |
| 2005/0177746 A1* | 8/2005 | Bunn et al. ................... 713/201 |
| 2006/0105714 A1* | 5/2006 | Hall et al. ..................... 455/41.3 |

FOREIGN PATENT DOCUMENTS

| JP | 2002-236561 | 8/2002 |
| JP | 10-2004-0067238 | 7/2004 |
| JP | 2004-199470 | 7/2004 |
| KR | 1020030012764 A | 2/2003 |

* cited by examiner

*Primary Examiner* — Taghi Arani
*Assistant Examiner* — Jason Lee
(74) *Attorney, Agent, or Firm* — Roylance, Abrams, Berdo & Goodman, L.L.P.

(57) ABSTRACT

A method and apparatus for securing information in a wireless network printing system are provided. The information security method includes setting and storing service items to be allowed according to wireless security levels supported by the wireless printer, selecting one of the wireless security levels, and executing a service requested by a user if the requested service is one of allowed service items for the selected wireless security level.

9 Claims, 4 Drawing Sheets

METHOD AND APPARATUS FOR SECURING INFORMATION IN A WIRELESS NETWORK PRINTING SYSTEM

CROSS-REFERENCE TO RELATED PATENT APPLICATIONS

This application claims the benefit under 35 U.S.C. §119(a) of Korean Patent Application No. 10-2005-0037033, filed on May 3, 2005, in the Korean Intellectual Property Office, the entire contents of which is incorporated herein in its entirety by reference.

BACKGROUND OF THE INVENTION

1. Field of the Invention

The present invention relates to a wireless network printing system. More particularly, the present invention relates to a method and apparatus for securing information in a wireless network printing system which prevent the outflow of information such as in-house secret information, personal information, and so on, by limiting services to be provided according to wireless security levels.

2. Description of the Related Art

A Wireless Local Area Network (WLAN) environment is based on the IEEE 802.11 Infrastructure mode WLAN or ad-hoc mode WLAN. The Infrastructure mode WLAN employs a Basic Service Set (BSS) composed of an Access Point (AP) and stations. The ad-hoc mode WLAN employs a BSS composed only of stations communicating with each other. In the Infrastructure mode, hosts access a wireless network printer server through an AP. That is, an AP, which is located between hosts and a wireless network printer server, relays packets being transmitted between the hosts and the wireless network printer server. In the ad-hoc mode, hosts (for example, personal computers (PCs)) are connected to a wireless network printer server and can directly communicate with the wireless network printer server.

When a wireless network printer server joins a wireless network, it must follow a wireless security policy of the wireless network. The wireless security policy can include: Static Wired Equivalent Privacy (WEP), Extensible Authentication Protocol-Transport Level Security (EAP-TLS), EAP-Tunneled TLS (EAP-TTLS), and EAP-Lightweight Extensible Authentication Protocol (EAP-LEAP) included in the 802.1x standard, Protected Extensible Authentication Protocol (PEAP), and Wi-Fi Protected Access-Pre-shared Key (WPA-PSK).

In these conventional technologies, all services of a wireless network printer server can be used whether a wireless security policy allowed by a wireless network is vulnerable or not. When a wireless network printer server joins a network with powerful security, the probability of the outflow of information is low when hosts communicate with the wireless network printer server. However, in a network environment without wireless security or with vulnerable wireless security, information, such as in-house secret information, personal information, information about hosts communicating with a wireless network printer server, and so on, may be obtained by undesired third parties through specific services.

SUMMARY OF THE INVENTION

The present invention provides a method and apparatus for securing information in a wireless network printing system by limiting services to be provided according to wireless security levels, and thereby preventing the undesired third parties from obtaining the information.

According to an aspect of the present invention, there is provided a method of securing information in a wireless network printing system which comprises a plurality of hosts and a wireless printer, comprising setting and storing service items to be allowed according to wireless security levels supported by the wireless printer, selecting one of the wireless security levels, and executing a service requested by a user if the requested service is one of allowed service items for the selected wireless security level. The step of setting and storing the service items comprises classifying wireless security supported by the wireless printer into a plurality of wireless security levels, defining service items to be limited according to a wireless security policy among services provided by the wireless printer, and setting and storing allowed service items for each wireless security level.

In the step of classifying the wireless security, the wireless security is classified into the plurality of wireless security levels on the basis of the vulnerability of the wireless security. In the step of defining the service items, at least one service item among a print function, an e-mail print function, a web server access function, a Simple Network Management Protocol (SNMP) communication function, and a Server Message Block (SMB) communication function is defined according to the wireless security policy.

The step of executing the service comprises obtaining a current wireless security level and allowed service items for the current wireless security level, and executing the requested service if the requested service is one of the allowed service items for the current wireless security level.

In the executing the service, if the requested service is not one of service items limited according to a wireless security policy, the requested service is executed, and, if the requested service is one of the limited service items, the step of obtaining the current wireless security level and the step of executing the requested service are executed.

According to another aspect of the present invention, there is provided an apparatus for securing information in a wireless network printing system which comprises a plurality of hosts and a wireless printer, comprising a service item setting unit for setting service items to be allowed according to wireless security levels supported by the wireless printer, a service item storage unit for storing service items set for each wireless security level, and a service execution controller for executing a service requested by a user if the requested service is one of the allowed service items for a selected wireless security level.

The service item setting unit comprises: a security level classification unit for classifying wireless security supported by the wireless printer into a plurality of wireless security levels, and a service item defining unit for defining service items to be limited according to a wireless security policy among services provided by the wireless printer. The security level classification unit classifies the wireless security into the plurality of wireless security levels on the basis of the vulnerability of the wireless security. The service execution controller executes the requested service if the requested service is not one of service items limited according to a wireless security policy.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF THE EXEMPLARY EMBODIMENTS

The present invention will now be described more fully with reference to the accompanying drawings, in which exemplary embodiments of the invention are shown. In the following description, a detailed description of known functions and configurations incorporated herein has been omitted for clarity and conciseness.

Figure 1:
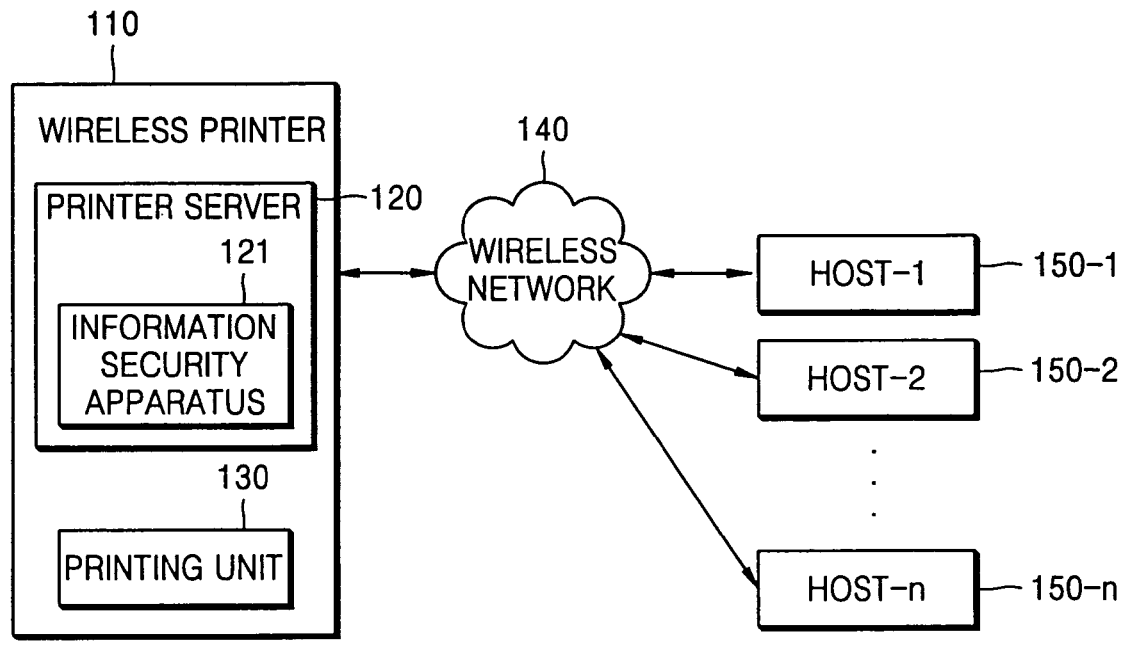
FIG. 1 is a block diagram schematically illustrating a wireless network printing system to which an exemplary embodiment the present invention is applied.

FIG. 1 is a block diagram schematically illustrating a wireless network printing system to which the present invention is applied in accordance with an exemplary embodiment.

Referring to FIG. 1, the wireless network printing system comprises a wireless printer 110, a wireless network 140, and hosts 150-1, 150-2, ..., 150-n.

The wireless printer 110 comprises a printer server 120 having an information security apparatus 121 and a printing unit 130 for performing print jobs under the control of the printer server 120. In FIG. 1, the printer server 120 is installed in the wireless printer 110. However, it is also possible to separate the printer server 120 from the wireless printer 110. Each of the hosts 150-1, 150-2, ..., 150-n may be any one of a PC comprising a wireless LAN card, a Palm Top computer, a notebook computer, a Personal Digital Assistant (PDA), and a cellular phone allowing the wireless Internet. The hosts 150-1, 150-2, ..., 150-n communicate with the wireless printer 110 through the wireless network 140.

Figure 2:
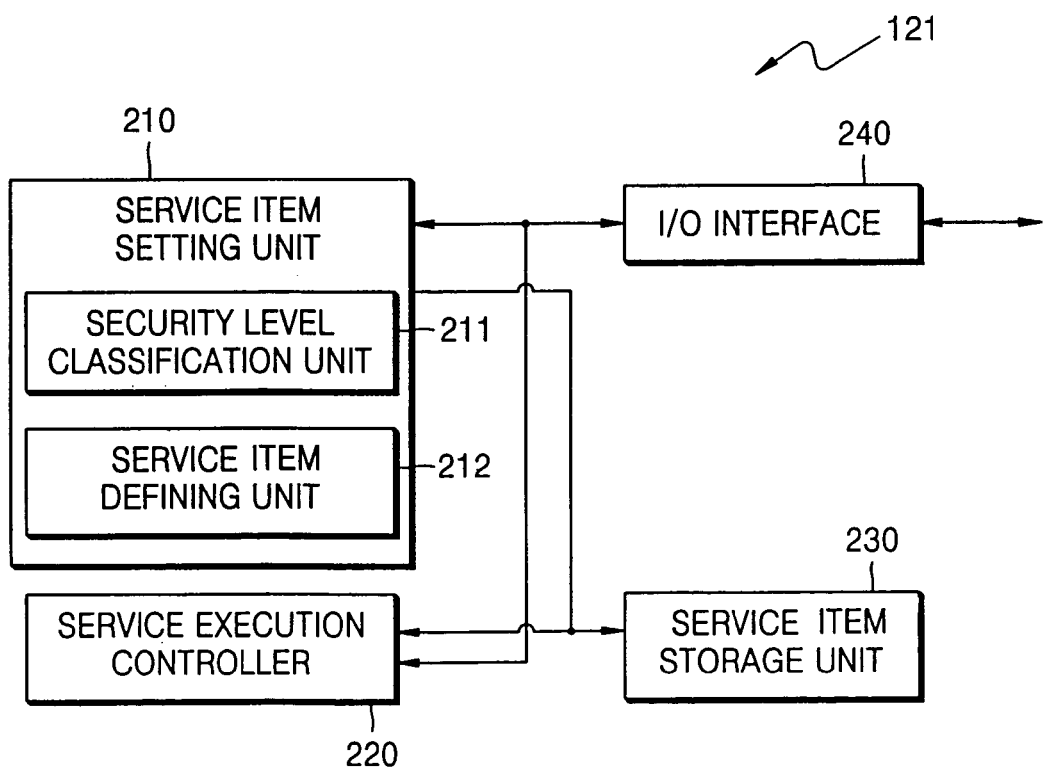
FIG. 2 is a block diagram of an information security apparatus of the wireless network printing system of FIG. 1, according to an exemplary embodiment of the present invention.

FIG. 2 is a block diagram of the information security apparatus 121 of the wireless network printing system, according to an exemplary embodiment of the present invention.

Referring to FIG. 2, the information security apparatus 121 comprises a service item setting unit 210 for setting allowed service items according to wireless security levels, a service execution controller 220 for executing a service requested by a user if the service is one of the allowed service items, a service item storage unit 230 for storing the service items, and an I/O interface 240 allowing data input/output through the wireless network 140.

The service item setting unit 210 comprises a security level classification unit 211 for classifying wireless security supported by the wireless printer 110 into a plurality of wireless security levels, and a service item defining unit 212 for defining service items to be limited according to a wireless security policy among services provided by the wireless printer 110. In the present embodiment, the security level classification unit 211 classifies the wireless security into the plurality of wireless security levels on the basis of the vulnerability of the wireless security, as will be described later.

Figure 3:
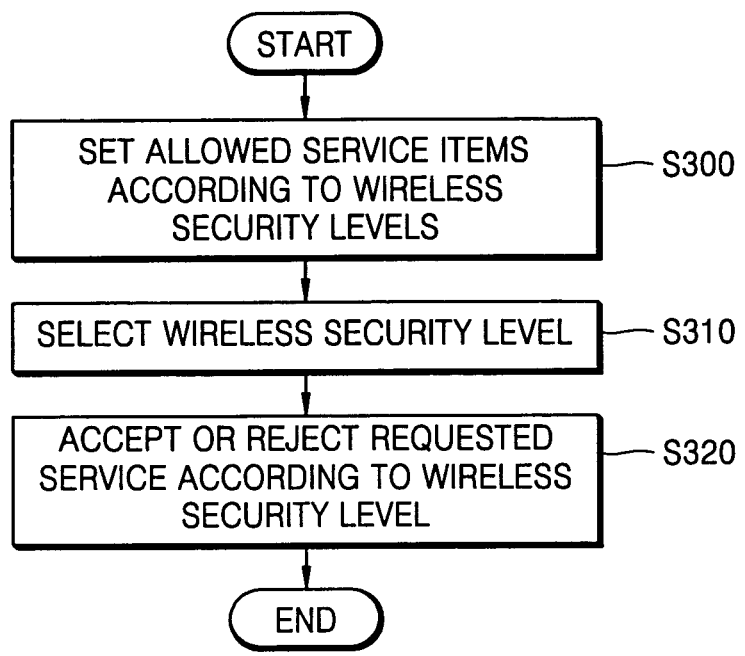
FIG. 3 is a flowchart illustrating an information security method used in the wireless network printing system, according to an exemplary embodiment of the present invention.

FIG. 3 is a flowchart illustrating an information security method used in the wireless network printing system, according to an exemplary embodiment of the present invention. Hereinafter, the information security method will be described with reference to FIG. 2 and FIG. 3.

Referring to FIGS. 2 and 3, in operation S300, the service item setting unit 210 sets service items to be allowed according to wireless security levels. The operation of the service item setting unit 210 will be described in detail later with reference to FIG. 4.

In operation S310, a user selects one of the wireless security levels provided by the wireless printer 110 while viewing the screen of a printer application or a liquid crystal display (LCD) installed in the wireless printer 110. When a wireless security level is selected by the user, the printer server 120 operates at the selected wireless security level until the user modifies the selected wireless security level.

In operation S320, when a user requests a service, the service execution controller 220 accepts or rejects the requested service according to the wireless security level. The operation of the service execution controller 220 will be described in detail later with reference to FIG. 6.

Figure 4:
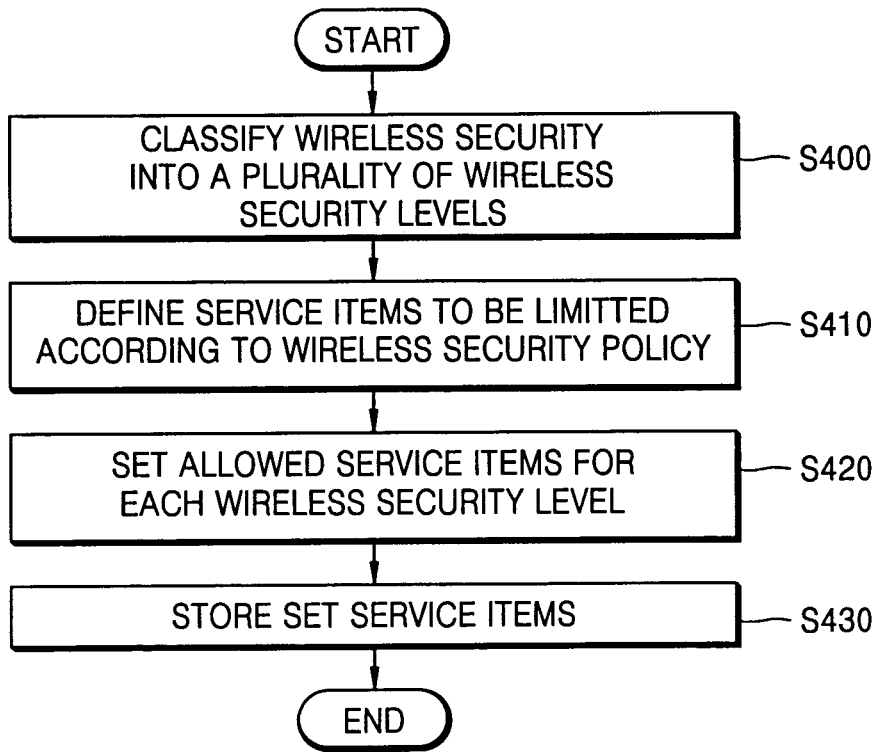
FIG. 4 is a flowchart illustrating the operation of a service item setting unit for performing operation S300 of FIG. 3.

FIG. 4 is a flowchart illustrating the operation of the service item setting unit 210 for performing operation S300 of FIG. 3.

Referring to FIGS. 2 and 4, in operation S400, the security level classification unit 211 classifies wireless security supported by the wireless printer 110 into a plurality of wireless security levels. The types of wireless security comprise static Wired Equivalent Privacy (WEP), EAP-TLS, EAP-TTLS, and EAP-LEAP included in the 802.1x standard, PEAP, and Wi-Fi Protected Access-Pre-shared Key (WPA-PSK). The criterion for classifying wireless security into the plurality of wireless security levels may be the vulnerability of the wireless security, the range of the wireless network, and so on. In the present embodiment, wireless security is classified into a no-security level, a vulnerable security level, and a powerful security level, on the basis of the vulnerability of the wireless security. The no-security level corresponds to an open system, the vulnerable security level corresponds to static WEP, EAP-Message Digest 5 (EAP-MD5), and EAP-MSCHAPv2, and the powerful security level corresponds to EAP-TLS, EAP-TTLS, EAP-LEAP, PEAP, and WPA-PSK.

In operation S410, the service item defining unit 212 defines service items to be limited according to a wireless security policy among services provided by the wireless printer 110. In the present embodiment, a print function, an e-mail print function, a web server access function, a Simple Network Management Protocol (SNMP) communication function, and a Server Message Block (SMB) communication function are defined as the limited service items.

Figure 5:
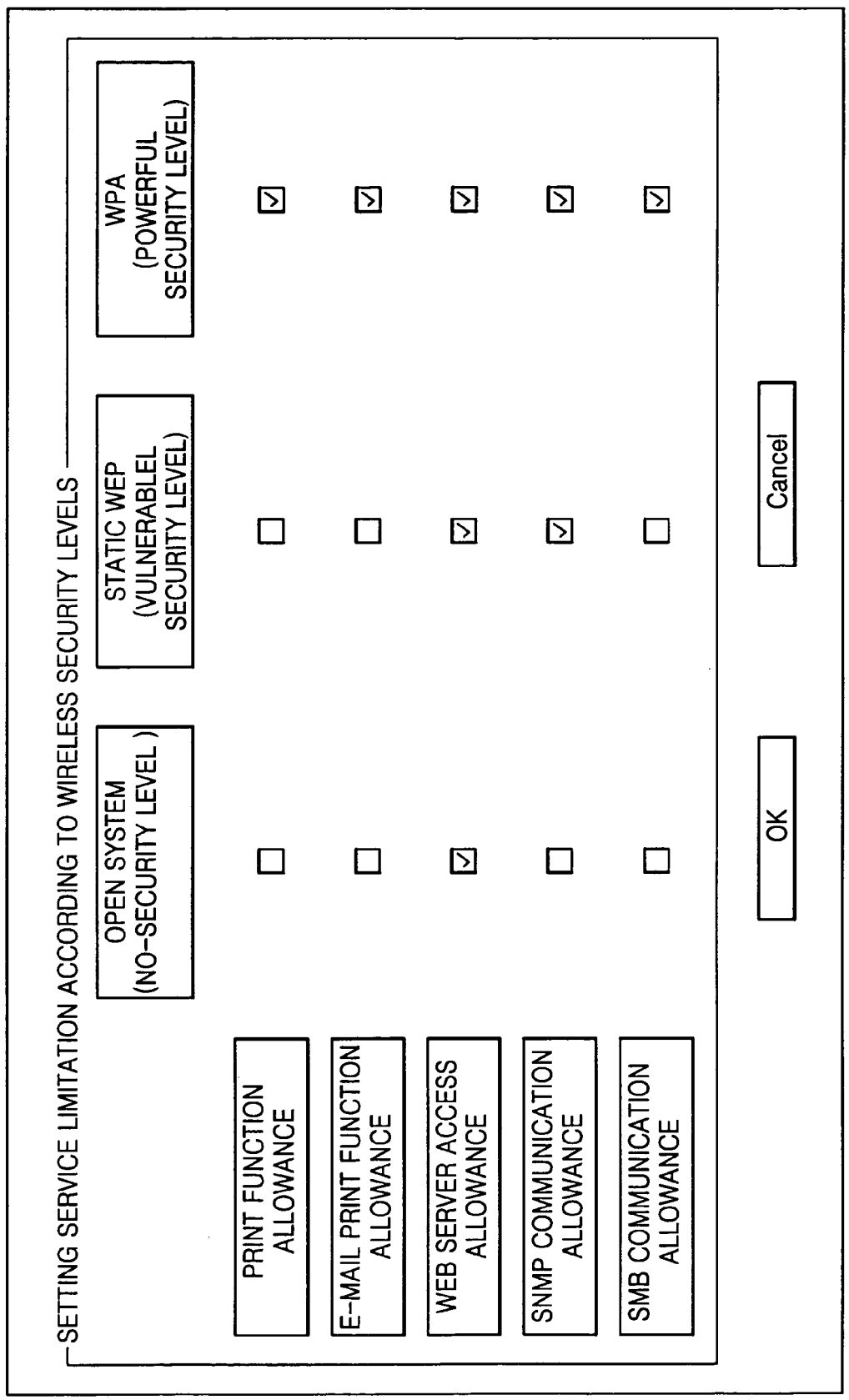
FIG. 5 shows an example of service item setting of the service item setting unit of FIG. 4 according to wireless security levels, the setting being displayed through a printer application.

In operation S420, the user sets service items to be allowed according to wireless security levels while viewing the screen of the printer application or an LCD installed in the wireless printer 110. FIG. 5 shows an example of service item setting according to wireless security levels, displayed through a printer application in accordance with an exemplary embodiment of the present invention. As shown in FIG. 5, the wireless security levels are classified into a no-security level corresponding to an open system, a vulnerable security level corresponding to a static WEP, and a powerful security level corresponding to a WPA. A user can set service items to be allowed for each wireless security level.

In operation S430, the set service items are stored in the service item storage unit 230.

Figure 6:
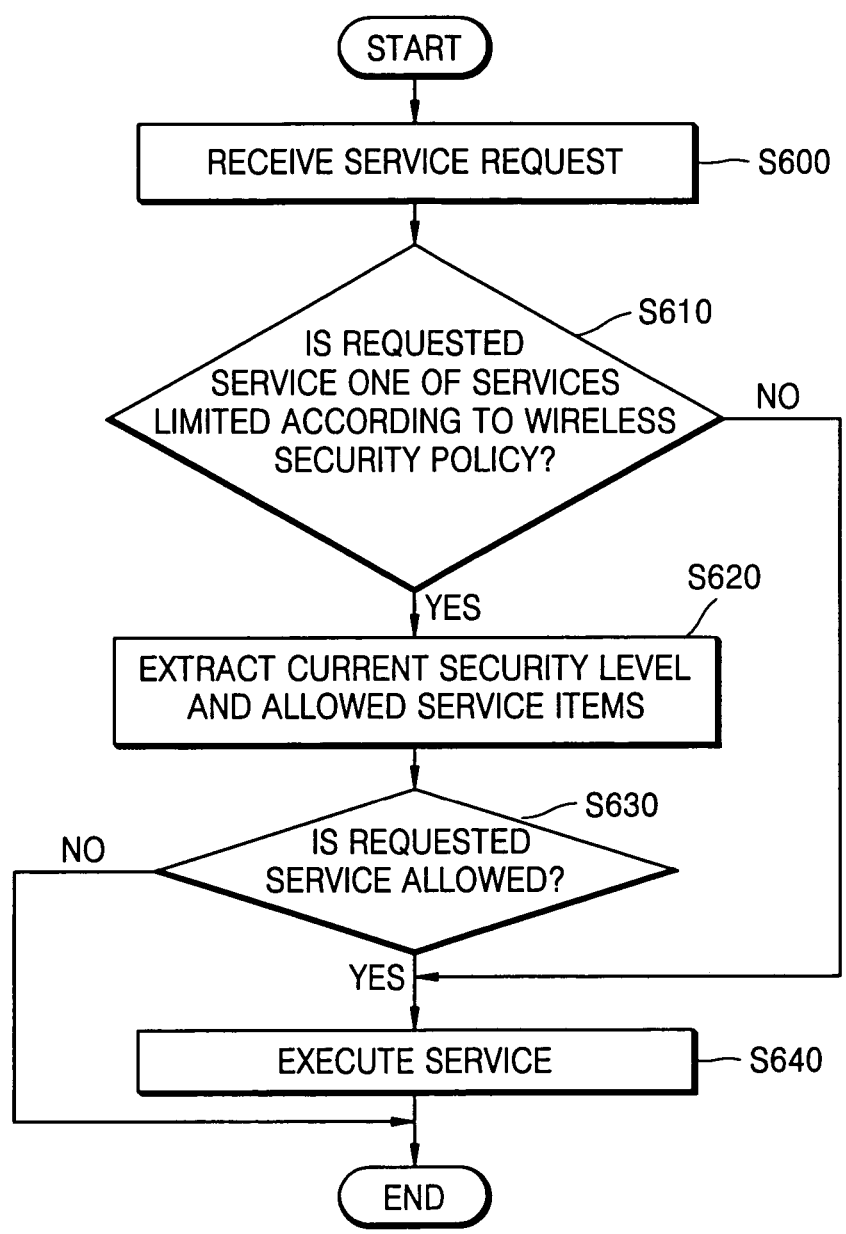
FIG. 6 is a flowchart illustrating the operation of a service execution controller for performing operation S320 of FIG. 3.

FIG. 6 is a flowchart illustrating the operation of the service execution controller 220 for performing operation S320 of FIG. 3.

Referring to FIGS. 2 and 6, if a service request is received from a user in operation S600, the service execution controller 220 determines whether or not the requested service is one of limited services according to a wireless security policy in operation S610. If the requested service is not one of the limited services, the process proceeds to operation S640 and the requested service is executed. For example, if a user requests to initialize the wireless printer 110, since the user's request is not one of the limited service items defined by the service item defining unit 212, the service execution controller 220 initializes the wireless printer 110.

If a service requested by a user is one of the limited service items, the process proceeds to operation S620. In operation S620, the service execution controller 220 extracts, reads from or otherwise obtains a current wireless security level and allowable service items from the service item storage unit 230. Successively, in operation S630, it is determined whether or not the requested service is one of allowed services for the current wireless security level. If the requested service is an allowed service, in operation S640, the service execution controller 220 executes the service. If the requested service is not one of the allowed services, the service execution controller 220 does not execute the service. At this time, the service execution controller 220 can display through a printer application a fact that execution of the service has been rejected.

It is assumed that service items allowed according to security levels are set as shown in FIG. 5 by way of an example. Here, it is assumed that a current wireless security level is set to static WEP. In this case, when a user requests an e-mail print function, execution of the service is rejected. However, when a user requests a web server access function, the service is executed.

As described above, according to the present invention, by limiting services according to wireless security levels, it is possible to prevent secret information, such as account information and passwords, server addresses, personal e-mail addresses and passwords, SNMP community names, and so on, from being obtained by undesired third parties through a wireless network, even when the wireless network has no wireless security or has vulnerable wireless security.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of securing information in a wireless network printing system which comprises a plurality of hosts and a wireless printer, comprising:
   providing a selection of wireless security levels corresponding to at least one service item;
   setting and storing each service item, that corresponds to a selected wireless security level, to be allowed according to a wireless security policy among services provided by the wireless printer;
   selecting at least one wireless security level for each service item, wherein each service item becomes an allowed service item for the selected wireless security level; and
   executing at least one service requested if the service requested is one of the allowed service items for the selected wireless security level,
   wherein the wireless security levels correspond to at least one of a plurality service items which comprise functions executable by the wireless printer; and
   wherein the step of setting and storing comprises classifying wireless security supported by the wireless printer into a plurality of wireless security levels, defining each service item to be limited according to the wireless security policy among functions provided by the wireless printer; and setting and storing each allowed service item for each of the plurality of wireless security levels.

2. The method of claim 1, wherein the step of classifying the wireless security further comprises classifying the wire security into the plurality of wireless security levels on the basis of the vulnerability of the wireless security.

3. The method of claim 1, wherein the step of defining the service items further comprises the step of defining at least one service item among a print function, an e-mail print function, a web server access function, a Simple Network Management Protocol (SNMP) communication function, and a Server Message Block (SMB) communication function, according to the wireless security policy.

4. The method of claim 1, wherein the step of executing the service comprises:
   obtaining a current wireless security level and allowed service items for the current wireless security level; and
   executing the requested service if the requested service is one of the allowed service items for the current wireless security level.

5. The method of claim 4, wherein, in the step of executing the service, if the requested service is not one of service items limited according to the wireless security policy, the requested service is executed, and, if the requested service is one of the limited service items, the step of obtaining the current wireless security level and the step of executing the requested service are executed.

6. An apparatus for securing information in a wireless network printing system which comprises a plurality of hosts and a wireless printer, comprising:
   a service item setting unit for providing a selection of wireless security levels corresponding to at least one service item, and setting each service item that corresponds to a selected wireless security level, to be allowed according to a wireless security policy among services provided by the wireless printer;
   a service item storage unit for storing each service item set for each wireless security level; and
   a service execution controller for executing a service requested by a user if the requested service is an allowed service item for a current wireless security level,
   wherein the wireless security levels correspond to at least one of a plurality service items which comprise functions executable by the wireless printer, and
   wherein the service item setting unit comprises a security level classification unit for classifying wireless security supported by the wireless printer into a plurality of wireless security levels, and a service item defining unit for defining each service item to be limited according to the wireless security policy among functions provided by the wireless printer.

7. The apparatus of claim 6, wherein the security level classification unit classifies the wireless security into the plurality of wireless security levels on the basis of the vulnerability of the wireless security.

8. The apparatus of claim 6, wherein the service item defining unit defines at least one of a print function, an e-mail print function, a web server access function, a Simple Network Management Protocol (SNMP) communication function, and a Server Message Block (SMB) communication function, according to the wireless security policy.

9. The apparatus of claim 6, wherein the service execution controller executes the requested service if the requested service is not one of service items limited according to the wireless security policy.

* * * * *